(12) United States Patent
Roy et al.

(10) Patent No.: US 10,944,770 B2
(45) Date of Patent: Mar. 9, 2021

(54) PROTECTING AGAINST AND LEARNING ATTACK VECTORS ON WEB ARTIFACTS

(71) Applicant: EMC IP Holding Company LLC, Hopkinton, MA (US)

(72) Inventors: Mainak Roy, Bangalore (IN); Chitrak Gupta, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 329 days.

(21) Appl. No.: 16/171,074

(22) Filed: Oct. 25, 2018

(65) Prior Publication Data

US 2020/0137084 A1    Apr. 30, 2020

(51) Int. Cl.
*H04L 29/06* (2006.01)
*G06F 21/55* (2013.01)
*G06N 20/00* (2019.01)
*G06F 16/2455* (2019.01)

(52) U.S. Cl.
CPC ...... *H04L 63/1416* (2013.01); *G06F 16/2455* (2019.01); *G06F 21/554* (2013.01); *G06N 20/00* (2019.01); *H04L 63/101* (2013.01); *G06F 2221/034* (2013.01)

(58) Field of Classification Search
CPC ... H04L 63/1416; H04L 63/101; G06N 20/00; G06F 16/2455; G06F 21/554; G06F 2221/034
USPC ........................................................ 726/23
See application file for complete search history.

(56) References Cited

U.S. PATENT DOCUMENTS

| 2005/0114700 A1* | 5/2005 | Barrie | H04L 63/0245 726/4 |
| 2006/0048228 A1* | 3/2006 | Takemori | H04L 29/06 726/22 |
| 2008/0052774 A1* | 2/2008 | Chesla | G06F 21/552 726/13 |
| 2012/0084423 A1* | 4/2012 | McGleenon | H04L 61/1511 709/223 |
| 2013/0312082 A1* | 11/2013 | Izu | H04L 63/02 726/13 |
| 2015/0089625 A1* | 3/2015 | Swanson | H04L 63/0227 726/11 |
| 2015/0128246 A1* | 5/2015 | Feghali | H04L 63/0209 726/13 |

(Continued)

*Primary Examiner* — Michael S McNally
(74) *Attorney, Agent, or Firm* — Staniford Tomita LLP

(57) ABSTRACT

A server includes a service processor hosted by a baseboard management controller (BMC) and independent of a CPU of the server. The server hosts web files. The service processor performs a set of monitoring tasks including receiving packets forming access requests made to the web files. A learning block is updated with information about suspicious packets. A counter is updated indicating a number of times a packet with a signature of a suspicious packet was received. When the counter reaches a threshold, a suspicious packet is analyzed in conjunction with other previously received suspicious packets. The analysis includes rearranging an arrival order of the suspicious packets into a new arrival sequence. The new arrival sequence of suspicious packets is matched to attack patterns in an attack pattern database. When the new arrival sequence matches an attack pattern, source IP addresses associated with the suspicious packets are added to a blacklist.

18 Claims, 12 Drawing Sheets

(56) References Cited

U.S. PATENT DOCUMENTS

2016/0308886 A1* 10/2016 Lee .................... H04L 63/1441
2017/0163670 A1* 6/2017 Manadhata ......... H04L 63/1441

* cited by examiner

FIG. 6A

PROTECTING AGAINST AND LEARNING ATTACK VECTORS ON WEB ARTIFACTS

TECHNICAL FIELD

The present invention relates generally to information processing systems, and more particularly to protecting hosted web files from attacks.

BACKGROUND

Web-based attacks have been responsible for damages in the many millions and even billions of dollars. Hackers exploit and continue to exploit vulnerabilities in websites to steal personal customer data, credit and financial information, and even disrupt elections and basic pillars of society. There exist many offline scanning services to help protect against attacks, but such services have several drawbacks including high subscription cost and the requirement to turn over proprietary code to a third party. It can be difficult to ensure the safety of code when it is released to a third party.

There is a continuing demand and need for an intelligent monitoring system that allows an organization to limit code exposure and that can effectively protect against known attack patterns and learn new attack patterns.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 6A shows another example of an access log, according to one or more embodiments.

DETAILED DESCRIPTION

Figure 1:
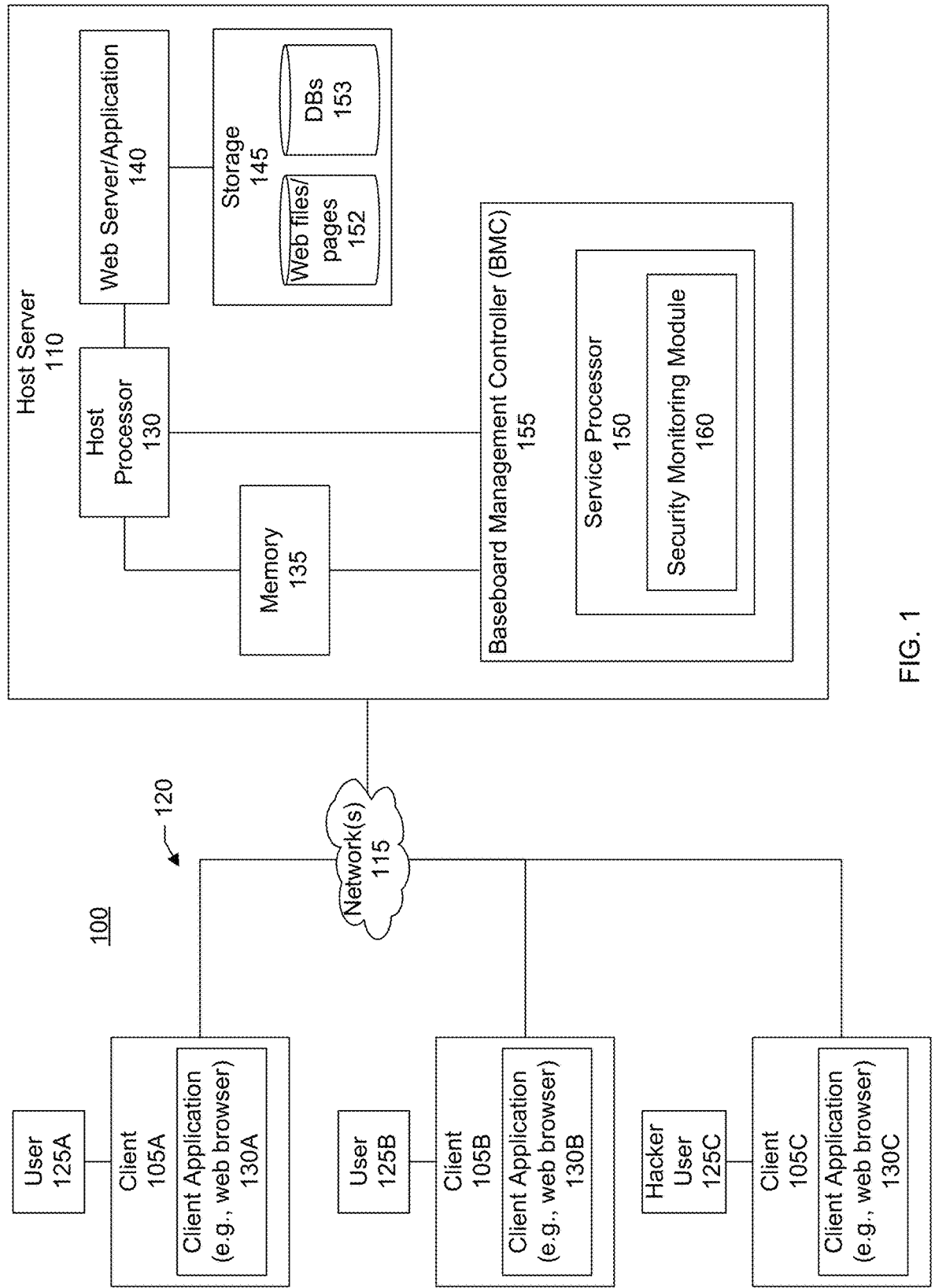
FIG. 1 shows a block diagram of a server having a service processor with a security monitoring module, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network.

Disclosed herein are methods and systems for a dynamic security apparatus and algorithm for learning attack vectors on web artifacts. An artifact refers to tangible by-products produced during the development of software. Some examples of web artifacts include web files such as web pages and databases. FIG. 1 shows a block diagram of a distributed computer network 100 in which a dynamic security apparatus and technique for learning attack vectors on web artifacts may be implemented. Computer network 100 includes a number of client systems 105A-C and a server system 110 connected to a communication network 115 via a set of communication links 120.

The communication network provides a mechanism for allowing the various components of distributed network 100 to communicate and exchange information with each other. The communication links may include hardwire links, optical links, satellite or other wireless communication links, or any other mechanism for communication of information. Various communication protocols may be used to facilitate communication between the various system shown in FIG. 1. These communication protocols may include Transmission Control Protocol (TCP)/Internet Protocol (IP), Hypertext Transfer Protocol (HTTP) protocols, wireless application protocol (WAP), vendor-specific protocols, customized protocols, and others. While in one embodiment, the communication network is the Internet, in other embodiments, the communication network may include any suitable communication network including a local area network (LAN), wide area network (WAN), wireless network, intranet, private network, public network, switched network, and combinations of these and the like.

Distributed computer network 100 in FIG. 1 is merely illustrative of an embodiment. One of ordinary skill in the art would recognize other variations, modifications, and alternatives. For example, more than one server system may be connected to the communication network. As another example, a number of client systems may be connected to the communication network via an access provider (not shown) or via some other server system.

The client systems typically request information from a server system which provides the information. For this reason, server systems typically have more computing and storage capacity than client systems. However, a particular computer system may act as both a client or a server depending on whether the computer system is requesting or providing information.

The server is responsible for receiving information requests from the client systems, performing processing required to satisfy the requests, and for forwarding the results corresponding to the requests back to the requesting client system. The processing required to satisfy the request may be performed by the server system or may alternatively be delegated to other servers connected to the communication network.

In a specific embodiment, the client systems enable users 125A-C to access and query information stored by the server system. In a specific embodiment, "web browser" applications 130A-C executing on the respective client systems enable users to select, access, retrieve, or query information stored by the server system. Examples of web browsers include the Internet Explorer browser program provided by Microsoft Corporation, the Firefox browser provided by Mozilla, the Safari browser and Mobile Safari browser provided by Apple Corporation, the Chrome browser provided by Google, and others.

In an embodiment, with a web browser executing on a computer workstation system, a user accesses a system on the World Wide Web (WWW) through a network such as the Internet. The web browser is used to download Web pages or other content in various formats including HTML, Extensible Markup Language (XML), text, Portable Document Format (PDF), and postscript, and may be used to upload information to other parts of the system. The web browser may use uniform resource identifiers (URLs) to identify resources on the web and hypertext transfer protocol (HTTP) in transferring files on the web.

The server is an example of an information handling system. The server may be referred to as a host server. In a specific embodiment, the host server includes a central processing unit (CPU) or host processor 130, memory 135, a web server/application 140, production storage 145, and a service processor 150.

The host server may be a single-processor system including one processor 130, or a multi-processor system including two or more processor(s) 130 (e.g., two, four, eight, or any other suitable number). The host processor may include any processor capable of executing program instructions. In an embodiment, a motherboard is provided, configured to provide structural support, power, and electrical connectivity between the various aforementioned components. Such a motherboard may include multiple connector sockets in various configurations, adapted to receive pluggable circuit cards, component chip packages, and so forth.

In an embodiment, the storage include web files such as web pages and files 152, other data that may be stored in a database 153 or other data structure, binaries required to run the web server, or combinations of these. An application such as a web server delivers web pages, files, or other storage data from production storage to the browsers. An example of a web server includes the Apache Web server from Apache Software Foundation. Examples of web applications include an e-commerce application, banking application, airline reservation application, customer relationship management (CRM) application, and many others. An application, such as an e-commerce application, may interact with the web server and storage to allow users to browse and purchase products.

The enterprise market is experiencing an evolution as more and more information is being exchanged across different sources. There is a continuous need to improve the user experience and provide enhanced capabilities which, in some cases, is actually producing security threats. Cyber-attacks are becoming common as has been observed in many places. Billions of dollars are lost in countering cyber threats. Once the attack is in place, and the data is compromised, it becomes immensely difficult for the business to function and operate.

The attacks over the network usually exploit certain weaknesses of design of the web pages. They can be the entry point for the hackers (e.g., hacker 125C). Major exploits may occur because of vulnerabilities in Hypertext Preprocessor (PHP) code, Structured Query Language (SQL) injections, injection of Trojans, privilege escalations/violation, and so forth.

PHP is a widely-used open source general-purpose scripting language that is especially suited for web development and can be embedded into HTML. PHP pages contain HTML with embedded code. The code may be executed on the server and generate HTML which is then sent to the client. Vulnerabilities in PHP code may be caused by a mistake that a developer made when writing the original code.

For example, remote code execution (RCE) occurs when an attacker is able to upload code to the website and execute it. A bug in a PHP application may accept user input and evaluate it as PHP code. This could, for example, allow an attacker to tell the website to create a new file containing code that grants the attacker full access to the website. When an attacker sends code to the web application and it is executed, granting the attacker access, they have exploited an RCE vulnerability.

As another example, SQL injection occurs when an attacker is able to send their own instructions to the database and the database executes those instructions. This can occur when a PHP developer has taken input from a website visitor and passed it to the database without checking to see if it contains anything malicious or bothering to clean out any malicious code. SQL Injection can allow an attacker to access the website data. They can also create new data in the database which may include links to malicious or spam websites. An attacker may also be able to use SQL Injection to create a new administrative level user account which they can then use to sign-into the website and gain full access.

As another example, cross-site scripting (XSS) occurs when an attacker causes malicious code to load in a website visitor's browser and execute. This code can then perform malicious actions like stealing user cookies, which can grant administrative level access, or performing functions as the user which can grant additional access.

As another example, cross-site request forgery (CSRF) occurs when an attacker can create a link and get a site administrator or someone with privileged access to click on that link which causes the site to take an action. For example, if an attacker was able to create a link that, when clicked on by a site admin, created a new "admin" user with a known password, that would be a CSRF attack. The attacker would then simply have to find a way to fool the site admin into clicking that link to create a new admin user with a password they know.

As another example, PHP object injection is a type of attack that occurs when a PHP application takes user input and passes it to a function called "unserialize( )" which takes a stored object and turns it into an object in memory.

As another example, remote file inclusion (RFI) is a type of attack that occurs when a PHP application takes user input and passes it to a function that is designed to load a file. If this file is a URL, the function may load PHP code from another website that an attacker specifies which will then be executed on the website. The inclusion of a remote file in a URL is known as remote file inclusion or RFI.

Hackers actively try to identify weaknesses in the web files, pages, and other data hosted on servers and try to exploit various weaknesses. A list of common weaknesses can be found in Common Weakness Enumeration (CWE), version 3.0 as provided by the MITRE Corporation of Bedford, Mass., available at https://cwe.mitre.org/data/published/cwe_v3.0.pdf, and which is incorporated by reference along with all other references cited. The attacker keeps on looking for vulnerabilities in the code files and checks for potential loopholes such as, for example, un-validated inputs like file uploads, files with global write privileges, hypertext access (.htaccess) files which are accessible (CWE-16), SQL injections, and running internal scripts. A hypertext access file is a directory-level configuration file supported by several web servers, used for configuration of site-access issues, such as URL redirection, URL shortening, access control (for different webpages and files), and more. The .htaccess file is often used to specify security restrictions for a directory, hence the filename "access." The .htaccess file is often accompanied by a .htpasswd file which stores valid usernames and their passwords.

A successful attack can provide the hacker with access to the code binaries. The hacker can then begin to inject their malicious code or overwrite an existing file (e.g., PHP file) with their own file containing malicious code. When the code or infected file is executed, such as when the web page is accessed, sensitive information may then be exposed to the hacker.

Figure 2:
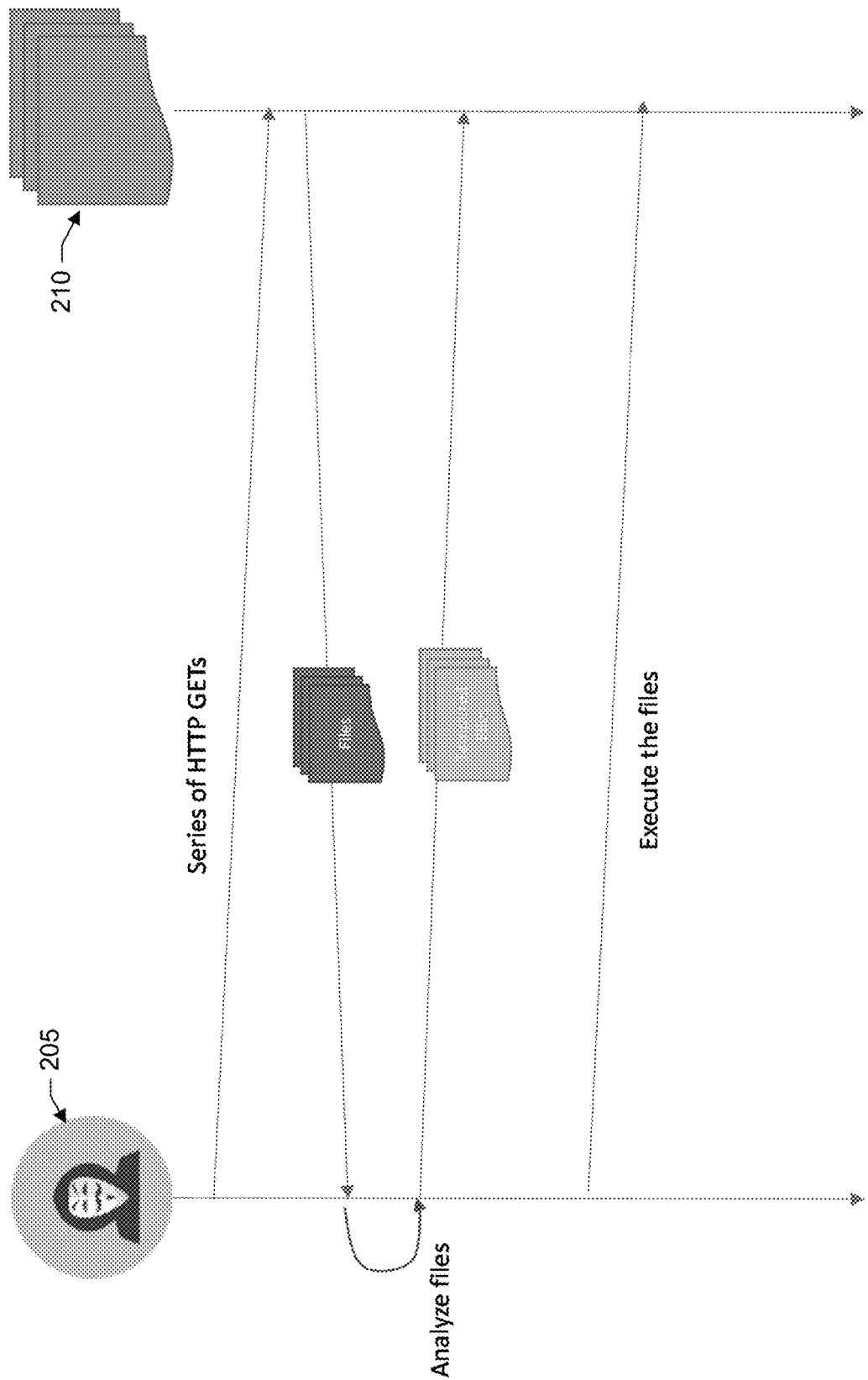
FIG. 2 shows an example anatomy of a web attack.

FIG. 2 shows an example anatomy of an attack. Generally, an attack starts when a hacker 205 obtains access to vulnerable files 210. For example, a webpage may accept an upload of jpeg files. The hacker can impersonate a .php file as .jpeg (or other digital image format) and upload to the server host or website. PHP scripts can be run even if they have different extensions. For example, admin.php can be renamed as admin.jpg and it will still run. The hacker may embed base64 encoded code in php files and modify them from inside. Every time a normal php page is accessed the code internally starts running.

Currently, the detection of attacks are manual. A web site analyzer may run through files and check for certain signatures. However, for proper protection and cleanup, manual effort is required. It can be a continuous process of attack and mitigate. The hackers will keep monitoring the gaps and the new point of entry every time an administrator attempts to fix/implement something for the business. Security scripts have not reached a state where they can dynamically learn, predict and adopt for the required protection.

In a specific embodiment, systems and techniques include an appliance for the scanning of web/code artifacts in a separated trust boundary. To support the efficient usage of various service processors, disclosed herein are methods to identify suspect code versus non-suspect code. In in-band scanners there can be an external agent running through the entire corpus that checks for signatures. In a specific embodiment, the scanner is hosted in a service processor and includes an intelligent scanning technique to understand suspicious accesses. In another specific embodiment, an algorithm is provided that learns the attack pattern and can perform selective scanning of incoming requests. In another specific embodiment, systems and techniques are provided for dynamic and updated scanning. Usually hacking attacks are dynamic. A correlation may be created between attack patterns and the impacts to the files. The hacker may attempt multiple packet formats to mask the (source code/entry path) attack as well. A static code analysis is not sufficient to correlate the attack vectors to that of file modifications.

In some systems, security may be driven by standard policies which include file cyclic redundancy check (CRC)/HASH checks, role based authorization, etc. However, in the case of most hacking attacks, the hacker can have elevated privileges and have complete control over the filesystem. In such scenarios the polices can be disabled too. Hacks happen in silence and the administrators are notified much later. By that time there can be large potential or actual losses to business and data. Hence a secure system is desirable which is in a different trust boundary and which is out of the reach of the hackers. In a specific embodiment, systems and techniques are provided for scanning and pattern learning algorithms on correlation between incoming attack patterns, along with access logs and checking for specific attack patterns.

Referring back now to FIG. 1, in a specific embodiment, systems and techniques are provided for an out-of-band method of scanning the web server files and providing alerts based on rules and specific actions on files which may have been compromised. In a specific embodiment, the server hosting the web files includes an out-of-band management platform and, more particularly, service processor 150.

The out-of-band management platform may include a dedicated channel for managing network devices. This allows the network operator to establish trust boundaries in accessing the management function to apply it to network resources. It also can be used to ensure management connectivity (including the ability to determine the status of any network component) independent of the status of other in-band network components.

In computing, one form of out-of-band management is sometimes called lights-out management (LOM) and involves the use of a dedicated management channel for device maintenance. It allows a system administrator to monitor and manage servers and other network-attached equipment by remote control regardless of whether the machine is powered on, or whether an operating system is installed or functional.

By contrast, in-band management through Virtual Network Computing (VNC), Secure Shell (SSH) or even serial ports is based on in-band connectivity and software that must be installed on the remote system being managed and only works after the operating system has been booted. This solution may be less expensive than servers having out-of-band management platforms, but unlike out-of-band management, it does not allow access to firmware Basic Input/Output System (BIOS) or Unified Extensible Firmware Interface (UEFI) settings, does not make it possible to reinstall the operating system remotely, and it cannot be used to fix problems that prevent the system from booting. In networking, it does not allow management of remote network components independently of the current status of other network components.

Both in-band and out-of-band (OOB) management may be performed through a network connection, but an out-of-band management card can use a physically separated network connector. A remote management card may include at least a partially independent power supply and can switch the main machine on and off through the network.

More particularly, service processor 150 may be hosted on a board or baseboard management controller (BMC) 155 or co-processor. A service processor may be referred to as a BMC or vice-versa. In a specific embodiment, the service processor (or BMC) may reside on a motherboard of the host server (or be provided on a separate expansion card), may have access to the host operating system (OS), memory map, and shared memory access, but is logically separate from the host server platform and thus may remain powered even when the server is off. Communication between the host and service processor or BMC may be via USB, PCI, Intelligent Platform Management Interface (IPMI), Keyboard Controller Style (KCS), or any other suitable communication scheme. The service processor or BMC, however, operates in a trust boundary separate from and independent of the host processor.

For example, the service processor may continue to run even if the host processor suffers a failure, may have its own IP address that is separate from the host IP address, may not be exposed to the Internet (e.g., accessible only via a management network or subnet), may have its own separate network connection, and so forth. Access may be via a remote connection over a LAN where security protocols such as Secure Sockets Layer (SSL) are in place. A LAN interface allows remote access over WAN links by directly accessing the IP address. The BMC may include sensors to measure physical parameters such as power supply voltage, fan speeds, operating system functions, humidity, temperature, and so forth. This out-of-band management controller may include its own processor, memory, network connection, and access to the system bus. The BMC may provide power management, virtual media access and remote console capabilities, that may be available through a supported web browser or command-line interface. This provides system administrators the ability to configure a machine as if they were sitting at the local console (terminal).

An example of an out-of-band management controller is the integrated Dell Remote Access Controller (iDRAC) as provided by Dell EMC of Hopkinton, Mass. It should be appreciated that while some embodiments may be described in conjunction with the iDRAC out-of-band management platform, aspects and principles can be applicable to other out-of-band management platforms such as Hewlett Packard Enterprise (HPE) Integrated Lights Out (iLO), Cisco EUCS, and others. Further discussion of a BMC is provided in U.S. patent application Ser. No. 14/881,136, filed Oct. 12, 2015, now U.S. Pat. No. 10,038,705, issued Jul. 31, 2018, and is incorporated by reference along with all other references cited.

In a specific embodiment, the service processor includes a security monitoring module 160. Execution of the security monitoring module may be isolated or separate with respect to the host processor because the security monitoring module is in the service processor. The security monitoring module includes the business logic providing intrusion detection services (IDS) and, more particularly, is responsible for security monitoring tasks such as scanning web files such as web pages to detect changes indicating the web page files may have been compromised, analyzing error and access logs associated with the web page files to detect attack patterns or attack vectors and other attempts to infiltrate the host, simulating attacks to detect vulnerabilities, analyzing received packets, learning new attack patterns or vectors, and taking actions based on the discovery of an attack. In other words, in a specific embodiment, intelligence for the security monitoring is not on the side of the host web server, but is on the side of the service processor. That is, components or code components such as the vulnerability scanner, file scanner, pattern recognizer for the attacks, rules and actions engine are inside the service processor.

Actions may include blacklisting IP addresses, generating alerts and notifications for an administrator, quarantining suspect files, shutting down web server services, or combinations of these. In a specific embodiment, action definitions include the scanner block performing prescribed actions as defined in the rule. The action block can update .htaccess files to restrict the IP addresses. The action block may quarantine any detected files and alert the administrators. On detection of a hack the administrator will be alerted.

In a specific embodiment, systems and techniques are provided to proactively stop different attack vectors targeting the hosted web artifacts. Algorithms are designed to understand the attack patterns and how hackers are attempting to compromise the security of the web artifacts. Signatures of the attack patterns are collected and stored so that the scanner can be updated and protect against later attacks having the same or similar attack pattern. In an embodiment, systems and techniques are provided for out-of-band security monitoring of web files and other data hosted on a server. These out-of-band security monitoring techniques can strike a good balance between the often competing demands of throughput and security protection. Successful attacks can be quickly detected, remediation actions deployed, and appropriate databases updated (e.g., source IP address added to blacklist and attack pattern library updated) in order to block or thwart similar attacks in the future.

Figure 3:
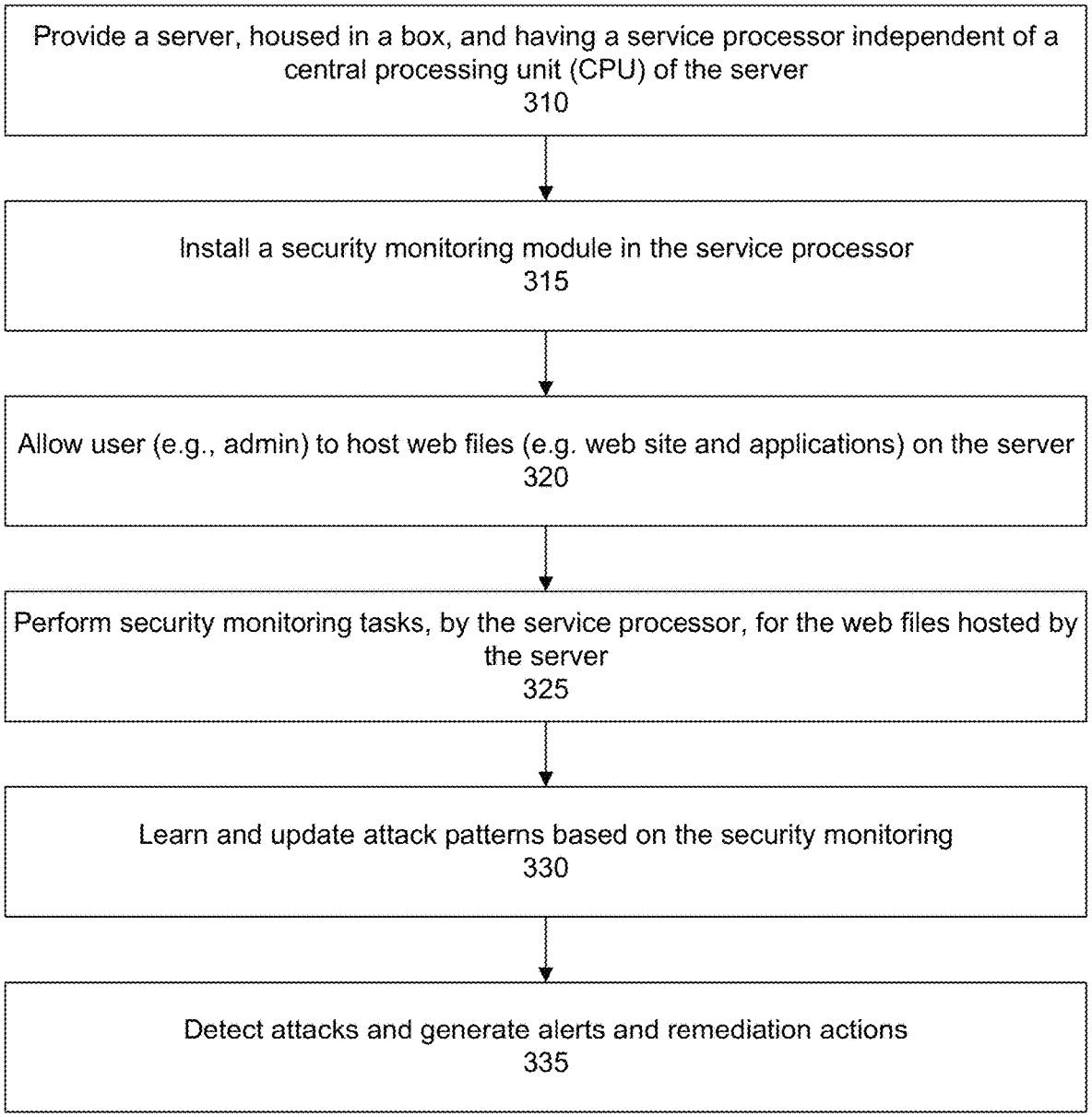
FIG. 3 shows an overall flow for monitoring web files and protecting against attacks, according to one or more embodiments.

FIG. 3 shows an overall flow of a service processor with security monitoring module. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 310, provided is a server, housed in a box or chassis, and having a service processor that is independent of a central processing unit (CPU) of the server. Both the service processor and CPU may be in the same single box. In a step 315, a security monitoring module is installed in the service processor. For example, the security monitoring module may be installed as firmware. In a step 320, a user (e.g., admin user) is allowed to host a website and applications on the server including web files (e.g., web pages, databases, and so forth).

In a step 325, the service processor with security monitoring module performs security monitoring tasks for the web files hosted by the server. In a step 330, the service processor learns and updates attack patterns based on the security monitoring. In a step 335, the service processor module detects attacks and generates alerts and remediation actions.

In a specific embodiment, systems and techniques are provided for a server having a built-in out-of-band security monitoring module. The server can be especially attractive to small or medium-sized businesses and organizations that may not have or be able to afford a complete line of security defenses that may be found in a large data center. These organizations may be exposed to multiple attacks. Many thousands or even millions of web pages may become compromised. A problem with traditional defenses is that such defenses are in-band and thus exposed to the Internet. As a result, in some cases, such defenses can be easily by-passed.

Offloading or moving the scanning from the host to the service processor (or BMC) helps to harden defenses because the service processor (or BMC) is in a separate trust boundary that is not exposed to the internet. Thus, even if the host becomes compromised by malware, Trojan, or other virus, damage will be limited because the service processor is in a different trust boundary. In other words, a system can include two different or separate levels of trust. A first level of trust is open to the Internet. A second level of trust is closed to the Internet. In a specific embodiment, the service processor (or BMC) is at the second level of trust. Access to the service processor (or BMC) may be via a management network or subnet whose external exposure is limited.

Figure 4:
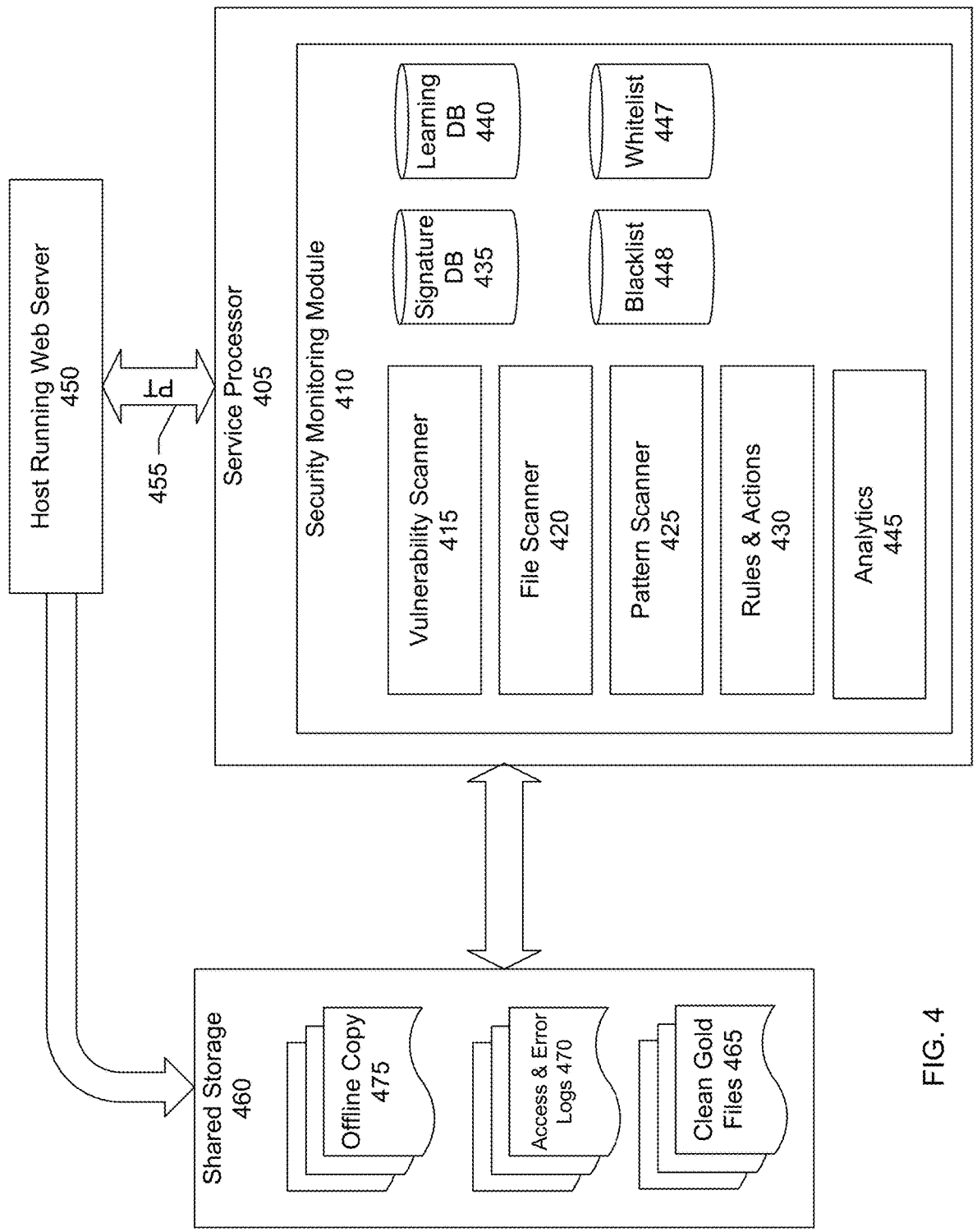
FIG. 4 shows an architecture of the service processor, according to one or more embodiments.

FIG. 4 shows an architecture of the service processor according to one or more embodiments. As shown in the example of FIG. 4, a service processor 405 includes a security monitoring module 410. The security monitoring module includes a vulnerability scanner 415, a file scanner 420, a pattern scanner 425, a rules and actions engine 430, a signature database 435, a learning database 440, analytics engine 445, whitelist 447, and blacklist 448. The service processor communicates with a host running a web server 450 via a pass through channel 455. The host and service processor have access to a shared storage 460 (e.g., shared memory). The pass through channel may include, for example, an internal network channel or USB.

In a specific embodiment, an out-of-band method of scanning the web server files and providing alerts based on rules and specific actions on files which may have been compromised is provided. The service processor can be hosted on a BMC or a co-processor which provides a security service to scan the files on a pre-determined interval. The service processor can inform through an authenticated request to copy the necessary files to the shared storage for scanning.

The service processor can send GET requests check for SQL injection responses over the pass through channel. For this the .htaccess for the web page should provide access for the internal IP. This can be modified on authentication and privileged access.

In a specific embodiment, when a request is received for file scan, the Web page files will be stored in a shared storage along with the user access and error logs. The shared storage space will also include the pristine files to check for changes and thus whether the files are compromised.

In a specific embodiment, the vulnerability scanner injects various SQL, PHP and base64 encoded code and to emulate a hacking session which had been carried out in the past. Such a simulation can be used to discover code vulnerabilities that a developer can then fix. The vulnerability scanner allows for in-situ testing of the hosted web pages and associated code including, for example, HTML pages, PHP code, JavaScript code, and so forth. Traditionally, such testing requires sending such source code to a third party to test and evaluate. Typically, the only protections a company will have are contractual obligations (e.g., nondisclosure agreements (NDAs)) and other promises from the third party that they will safeguard the source code. In many cases, these safeguards are insufficient as a rogue employee may simply ignore their duties and responsibilities. Thus, it is very difficult to ensure the protection of source code when the code is handed to other third parties.

In a specific embodiment, the file scanner checks first for the access and error files. The file scanner may match some of the attack vectors from the signature DB which are associated with GET/POST/PATCH requests.

In a specific embodiment, the pattern scanner checks for modified attack vectors with the learning DB. The learning DB may be referred to as a vector or attack vector database. In a specific embodiment, the learning DB is continuously appended with changing patterns. The analytics engine takes a call on the update of the learning DB.

The whitelist may store listings of source IP addresses known to be safe or not malicious, access patterns determined to be not malicious, packet signatures known to be not malicious, or combinations of these. The blacklist may store listings of source IP addresses known or otherwise determined to be not safe or malicious, access patterns determined to be malicious, packet signatures known to be malicious, or combinations of these. A packet signature may be based on or incorporate attributes such as a source IP address associated with the packet, associated protocol, intended destination port, string or group of bytes in the packet, or combinations of these.

In a specific embodiment, the vector databases are created out of different well-known attack signature libraries. Some examples of signature libraries include common weakness (CWE) libraries and common vulnerabilities and exposures (CVE) libraries as provided by the MITRE Corporation. Some of the attack signatures may be normalized by snort or snort-like open sources. Snort is an open source network intrusion prevention system, capable of performing real-time traffic analysis and packet logging on IP networks. It can perform protocol analysis, content searching/matching, and can be used to detect a variety of attacks and probes, such as buffer overflows, stealth port scans, common gateway interface (CGI) attacks, server message block (SMB) probes, OS fingerprinting attempts, and more.

Table A below shows an example rule.

TABLE A pkt_data
This option sets the cursor used for detection to the raw transport payload. Any relative or absolute content matches (without HTTP modifiers or rawbytes) and other payload detecting rule options that follow pkt_data in a rule will apply to the raw TCP/UDP payload or the normalized buffers (in case of telnet, smtp normalization) until the cursor (used for detection) is set again.
This rule option can be used several times in a rule.
    alert tcp any any -> any any(msg:"Absolute Match"; pkt_data; content:"BLAH"; offset:0; depth:10;)
    alert tcp any any -> any any(msg:"PKT DATA"; pkt_data; content:"foo"; within:10;)
    alert tcp any any -> any any(msg:"PKT DATA"; pkt_data; content:"foo";)
    alert tcp any any -> any any(msg:"PKT DATA"; pkt_data; pcre:"/foo/i";)

In a specific embodiment, the rules can be stored as a database which converts the standard snort rules and signatures into regex patterns in eXtensible Markup Language (XML) or JavaScript Object Notation (json) objects. Conversion may be implementation specific and may be performed either manually or automatically.

The rules and actions engine handles the notifications and quarantining any suspect files. In extreme cases, the rules and actions engine can instruct the host to shut down web server services.

Figure 5:
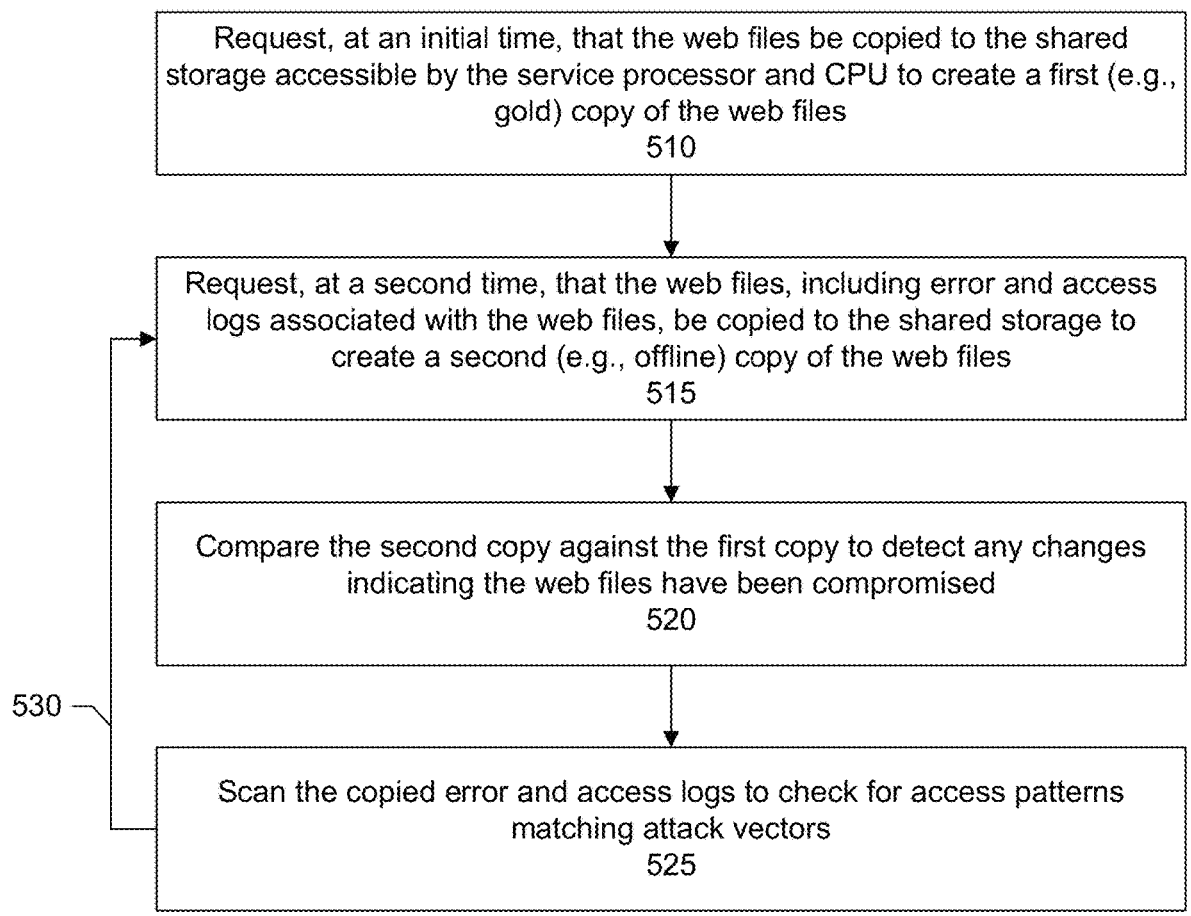
FIG. 5 shows a flow of a monitoring task, according to one or more embodiments.

FIG. 5 shows an overall flow of a security monitoring task that detects changes made to the web files hosted by the server. In a step 510, the service processor requests at an initial or first time that the hosted web files be copied to the shared storage accessible by the service processor and host to create an initial (e.g., first) copy or version of the web files 465 (FIG. 4). The initial or first copy may be referred to as a gold copy. The gold copy of the web files corresponds to the initial deployment or hosting of the files to the web server. The shared storage may include shared memory such as RAM space or non-volatile storage. Data written or stored by the host to the shared storage may be read by the service processor.

In a step 515, the service processor requests at a second time, after the initial time, that the hosted web files (including associated logs 470 (FIG. 4)) be copied to the shared storage to create a second copy or version of the web files 475 (FIG. 4) so that scanning can be performed without impacting the production version or operation of the hosted web files. In other words, the scanning or checking of the web files can occur during or while the hosted production web pages remain active. The second copy may be referred to as an offline or backup copy. The associated logs may include entries storing error messages and access requests generated or made between the first and second times. The error messages may have been generated by the host web server, web site, or web application between the first and second times. The access requests may include hypertext transfer protocol (HTTP) requests (or other Internet protocol) issued by the client devices to the server between the first and second times.

In a step 520, the second copy is compared against the initial or first copy of the web files to detect any changes indicating the web files were compromised.

In a step 525, the copied logs are scanned to check for access patterns matching attack vectors. For example, the access requests listed in the logs may be compared against a database or library of known attack patterns. Comparisons or searches may be performed using regular expressions. Upon detecting a matching pattern, an alert notification may be generated, the IP address associated with the access request matching the attack pattern may be added to a blacklist of IP addresses to block.

An access request may be reviewed to determine, for example, the presence of executable code, strings indicating script code, portions of script code, code symbols, code words or parameters used in script code, scripting tags, and so forth. Generally, a legitimate access request does not include code. Thus, the detection of code (or code syntax) in an access request may indicate a hacking attempt. As discussed, in many cases, a hacker will not send the entire portion of malicious code in a single request. Rather, bits and pieces of the malicious code may be spread across any number of different requests. The detection of such code elements in a request may result in the flagging of the request as suspicious and packets including packet signature and details associated with the request may be stored for later analysis and reassembly into different packet arrival sequences.

Steps 515-525 can be periodically repeated 530 at regular intervals in order to provide continuous or on-going monitoring. For example, the administrator user may configure scanning to occur every hour, every other hour, every day, every week, or at any other frequency as desired. Frequent scanning's can increase the probability of quickly detecting an attack before serious damage occurs, but may also impose processing overheard on the service processor. The system is flexible and allows administrators to tailor the frequency of scans to their needs.

In other words, in an embodiment, at the scheduled time (or on-demand), the web files are copied to the shared storage and compared against the initial gold copy of the web files to detect any changes, differences, or discrepancies that may indicate an attack or compromise. Changes may include the addition of a new function to the code (e.g., web file), deletion of an existing function from the code, the addition of new parameters to an existing function in the code, the deletion of existing parameters from an existing function, the addition of a new web file, the deletion of an existing web file, or combinations of these. The changes may be written to a differencing file.

When during the checking of an offline copy of a web file with a corresponding gold copy of the web file a change indicating compromise is detected one or more actions may be deployed to remediate according to the rules and actions block. For example, the rules may specify generating an alert notification for the administrator user, adding an IP address to a blacklist, shutting down a web service, or combinations of these. In a specific embodiment, the gold copy of the web file may be copied back from the shared storage to the host production storage, thereby overwriting the compromised production version of the web file with the original gold copy maintained in the shared storage.

The continuous checking of the web files for changes and scanning of the logs allows the analytics block to learn attack patterns and update the learning DB accordingly. For example, when a change to a web file is detected, a time of the change as indicated by a last modified date of the web file may be used to cross-reference or index the access logs and discover the access requests corresponding to the time of change. These access requests may then be added to the attack pattern libraries so as to update the libraries with a new attack pattern. A pattern may be added as a regular expression (also referred to as regex). A regular expression is a sequence of characters that define a search pattern for matching text. IP addresses associated with the access requests may be added to the blacklist.

calculating a first number of files in the first copy; calculating a second number of files in the second copy; and generating an alert if the second number is different from the first number.

However, hackers can be creative, and they can overwrite known files (e.g. admin.php) and embed innocuous looking code in base64 encoded formats. Further, sometimes a hacker will upload php files with .jpg or .png extensions and try to execute them. Such attacks can be thwarted by periodically checking the files for changes indicating compromise, scanning the error and access logs for evidence of an attack, or both.

Table B below shows an example where the file "admin.php" has been comprised by a new function "updatexml randomize" has been added.

TABLE B 173.239.202.3 - - [12/Oct/2017:03:52:40 -0700] "GET/
admin.php?id=2'+and+updatexml(rand( ),(%2f%2P/02f%2fsE1EcT(%2f%2f%2f%2
fsE1EcT+%2f%2f%2f%2fuNhEx(%2f%2f%2f%2fhEx(%2f%2f%2f%2fcOnCaT(
0x3f7e21,count(t.%2f**%2f%2f* *%2ftAbLe__NaMe),0x3f7e21)))+%2f%2f%2f%2ffRoM+
information__schema.%2f%2f%2f%2fsChEmAtA+as+d+join+information__schema.%2f**%
2f%2f%2ftAbLeS+as+t+on+t.%2f%2f%2f%2ftAbLe__ScHeMa+=+d.%2f%2%2f**%
2fsChEmA__nAmE+join+information__schema.%2f%2f%2f%2fcO1UmNs+as+c+on+c.%2f*
*%2f%2f%2ftAbLe__ScHeMa+=+d.%2f%2f%2f%2fsChEmA__nAmE+and+c.%2f%2f
%2f%2ftAbLe__NaMe+=+t.%2f%2f%2f%2ftAbLe__NaMe+%2f%2f%f(*%2fwHeRe+
not+c.%2f%2f%2f%2ftAbLe__ScHeMa+in(0x696e666f726d6174696f6e5f736368656d61,
0x6d7973716c)+and+c.%2f%2f%2f%2fcO1UmN__nAmE+like+0x25626974636f696e25)),0)+
and+'1'='1 HTTP/1.1" 301 1001

Even if no changes have been detected in the web files, the access logs may reveal an attack pattern from one or more IP addresses targeting particular files that are generally not allowed to be accessed. Upon discovery of the attack, firewall rules may be updated to block or blacklist these IP addresses.

Figure 6:
FIG. 6 shows an example of an access log, according to one or more embodiments.

For example, FIG. 6 shows several entries 605 of an access log 610 for a web application that may be hosted by the server. The access log reveals an attack to access passwords.

A first column 615 of the log lists a source IP address associated with an access request. A second column 620 identifies the resource or URL for which access was attempted. A third column 625 lists the timestamp or time and date that the request was made to the web application.

In some cases, attacks are distributed with slight modifications in patterns. As shown in the example attack pattern of FIG. 6, the attacker is trying to reach "/etc/passwd" and trying to fetch it through injections and having a distributed attack. Different methodologies have been attempted to access the password file of the web page including attacking a potential vulnerability in the PHP file "blog-details.php." In a specific embodiment, the security monitoring module learns suspect patterns and creates a blacklist DB as it sees more and more cases. In a specific embodiment, the blacklist DB will contain the IP addresses from which the attacks are being distributed and the URLs that are being tried.

In a specific embodiment, for website hacks, the file scanner checks for the pattern differences in each file in addition to checking changed or new files. If unknown files are added it is a straight flagging. For example, in a specific embodiment, a method includes requesting, at a first time, that hosted web files in a directory be copied to the shared storage to create a first copy; requesting, at a second time, after the first time, that the hosted web files in the directory be copied to the shared storage to create a second copy;

In many cases, the file "admin.php" may be the landing page of the web server. The new function can be detected by comparing the file against the initial or gold copy of the "admin.php" file which will not include such a function. As shown in table B above, the hacker is attempting to add additional parameters to the function. This exploit may be found in cases where a parameter check to validate the values that a function can accept is not performed. In these cases, the hacker may input any string that the function copies to another place (e.g., adds malicious code to other file).

In a specific embodiment, a flow for automating vector pattern analysis is based on a passive automated mode of operation. The web files are made available to the service processor in an offline mode and the operations of scanning are sequenced. The vulnerability and file scanners check for new or suspicious files and file pattern differences. The check can be based on the file modification dates and the URL accessed.

Table C below shows a flow for automating vector pattern analysis.

TABLE C

Figure 6A:
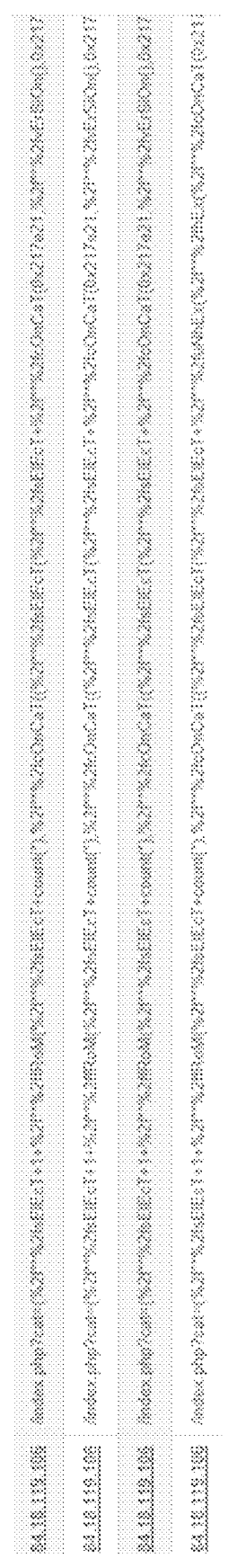

| Step | Description |
| --- | --- |
| 1 | Open URL Access logs. Iterate through the access logs and check the accessed URLs and the pattern |
| 1A | Filter the known (safe) IP addresses and skip them |
| 1B | For unknown IP addresses scan the URL |
| 1C | Take the example of FIG. 6A of a URL access log showing an unknown pattern. If an unknown pattern occurs the URL is flagged for deeper check. Expected operation: index.php/ |
| 1D | For each unknown pattern update suspect DB and add IP to blacklist DB |
| 1E | Check error.logs and check the errors generated for files |
| 2 | Open the file accessed in the URL for checking for tampering. |

TABLE C-continued

| Step | Description |
| --- | --- |
| 2A | Find the difference between active file and the pristine copy. If difference is observed create a diff file and log and alert |
| 2B | For the difference, check for patterns which are included in signature database |
| 2C | Check for embedded signatures (e.g. base64decode( )) and perform regex matches and alert based on pattern matches |

The above technique helps to balance performance throughput and security monitoring. More particularly, access requests made to the web files that originate from or are associated with source IP addresses on a whitelist may be excluded from a detailed or deeper review and check. Access requests made to the web files that originate from or are associated with source IP addresses not on the whitelist may be subject to the detailed review.

In a specific embodiment, there is a method for protecting against attacks to web files hosted on a web server, the web server having a service processor that is independent of a central processing unit (CPU) of the web server, the method comprising: requesting, by the service processor, that logs associated with the web files be copied to a shared storage accessible by the service processor and the CPU, the logs comprising entries storing access requests made to the web files between a first time and a second time; filtering the entries to identify first and second subsets of access requests, the first subset of access requests having associated source IP addresses listed on a whitelist, and the second subset of access requests having associated source IP addresses not listed on the whitelist; and flagging the access requests of the second subset for further review, the further review comprising: comparing the flagged access request to a library of attack patterns to determine whether the flagged access request matches an attack pattern; upon determining a match to the attack pattern, generating an alert and adding a source IP address associated with the flagged access request to a blacklist; requesting, by the service processor, that a web file associated with a flagged access request be copied from production storage to the shared storage; comparing the web file to another copy of the web file created at the first time to detect changes made to the web file between the first and second times indicating that the web file was compromised; upon detecting the changes, logging the changes in a differencing file, generating the alert, and adding the source IP address associated with the flagged access request to the blacklist; and repeating the further review for each flagged access request made to the web files between the first and second times.

Figure 7:
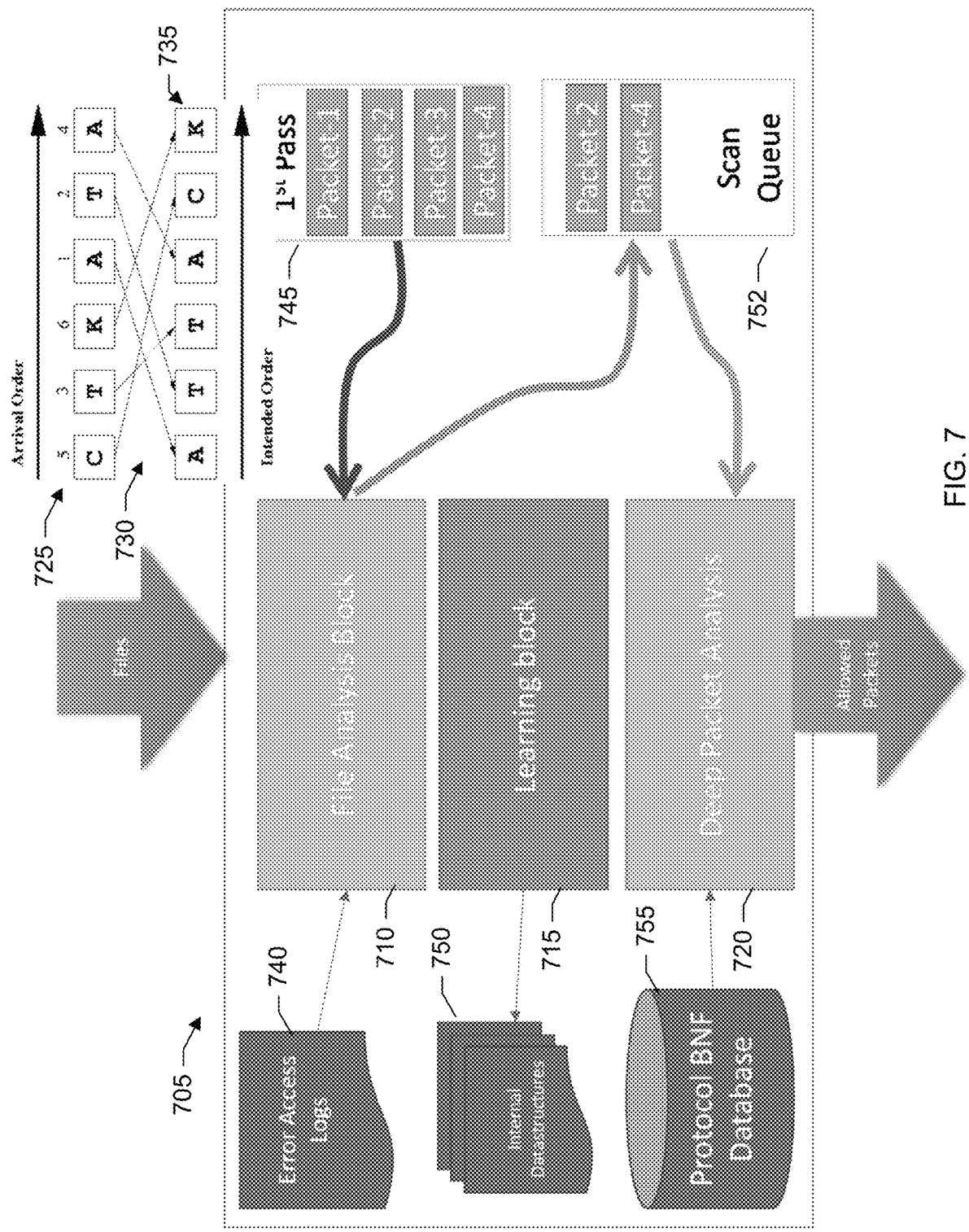
FIG. 7 shows a block diagram for re-ordering the arrival sequence of packets, according to one or more embodiments.

FIG. 7 shows a block diagram where a hacker is attempting to mask the attack on the host server through sporadic access requests that include small portions of malicious code. These small portions of malicious code may be sent out of sequence or out of their intended order so as to mask the attack. Legitimate requests may be mixed in to further obfuscate and hide the attack.

As shown in the example of FIG. 7, a security monitoring module 705 may include a file analysis or scanning block 710, learning block 715, and deep packet analysis block 720. The learning and deep packet analysis blocks may be part of an intrusion detection system (IDS) provided by the security monitoring module. In a specific embodiment, a set of packets 725 forming the access requests arrive out of order. For example, packet 5 ("C") may arrive first, followed by packet 3 ("T"), followed by packet 6 ("K"), followed by packet 1 ("A"), followed by packet 2 ("T"), followed by packet 4 ("A"). In a specific embodiment, the security monitoring module analyzes and reassembles 730 the packets into a new arrival sequence 735 of their intended order—e.g., packet 1 ("A"), packet 2 ("T"), packet 3 ("T"), packet 4 ("A"), packet 5 ("C"), and packet 6 ("K")—to detect an attack.

In other words, in some cases, the hacker will not send the entire piece of malicious code in a single request. Rather, the hacker may send small portions of the malicious code in sporadic bursts, different packet sequences, and so forth. The hacker may attempt to have the various small portions of their code uploaded to the host; and then may aggregate the uploaded packets into their proper order to run and execute the malicious code. The hacker may attempt to modify small portions of the code so as to not draw immediate attention. If the attempt is successful, the hacker may follow with a larger code modification and so forth until the entire portion of the malicious code has been uploaded. The hacker may attempt to create a backdoor through which the malicious code can be uploaded, distributed throughout the file system, and then duplicated. The malicious code may then begin infecting backup copies of the code that may be stored in multiple locations. The security monitoring module can learn the different attack patterns that have been logged as access requests in the error and access logs.

As discussed, the packets forming the requests and containing portions of the malicious code many not necessarily arrive in the order that the code is to be executed. In a specific embodiment, there is a first pass in which the file analysis block reviews error access logs 740 in conjunction with the corresponding packets forming the access requests. Aggregating the packets in the order in which they arrive may not necessarily reveal a match to an attack pattern because the packets may be arriving in a mixed order or out of sequence. Thus, it may not appear that malicious code is being injected. Further, as discussed, the hacker may include proper packets to further mislead the file scanner and security monitoring module.

Thus, in a specific embodiment, the security monitoring module learns the patterns and can reassemble the received packets in a new arrival sequence that is different from an arrival sequence in which the packets were originally received. The security monitoring module can reassemble and manipulate the received packets into any number of combinations or permutations to determine whether there is match or resemblance to an attack pattern. Packets may be reassembled using any competent reassembly technique such as IP/TCP reassembly or de-fragmentation. Moreover, in some cases, it is not sufficient to merely reassemble packets from the same single source IP address because a hacker may change their source IP address. Packets seeming to come from different source IP addresses may in fact be of the same signature.

During a first pass 745, packets may be examined in conjunction with the error and access logs to distinguish between suspicious and non-suspicious packets. The learning block may store data or information about suspicious packets in internal data structures 750. The data or information stored may include packet detail and state information such as a packet signature, source IP address, arrival timestamp, header details, payload, various parts of the corresponding access request, and so forth. A packet may be deemed suspicious when, for example, the corresponding access request appears to be attempting access to sensitive files (e.g., passwords).

In the example shown in FIG. 7, packets 2 and 4 have been determined to be suspicious. Suspicious packets may be added to a scan queue 752 for a deep packet analysis. The deep packet analysis may include accessing a protocol backus naur form (BNF) database 755 to process the suspicious packets.

Packets determined to be suspicious may initially be allowed to pass along with the non-suspicious packets. However, the suspicious packets and, more particularly, their packet signatures and source IP addresses are tracked. For example, scrutiny may be increased where there is a shift in the IP address and packets with the same suspicious signature forming access requests to the same sensitive file now appear to be originating from a new different IP address.

The new different IP address is tracked and the security monitoring module attempts to reassemble packets from the new IP address and previous IP address and perform pattern matching. In a specific embodiment, once a pattern match is found, both the new and previous IP addresses may be added to the blacklist. In another specific embodiment, a threshold counter is used to determine when the IP addresses should be added to the blacklist. For example, if a number of suspicious packets associated with a particular source IP address exceeds a threshold, the particular source IP address may be added to the blacklist. If a number of suspicious packets with the same signature originating from two or more different source IP addresses exceeds a threshold, each of the two or more different source IP addresses may be added to the blacklist. A notification alert may be generated for the administrator user that identifies the file being targeted. This allows the administrator to ensure that the proper defenses have been erected to protect the file being targeted.

Figure 8:
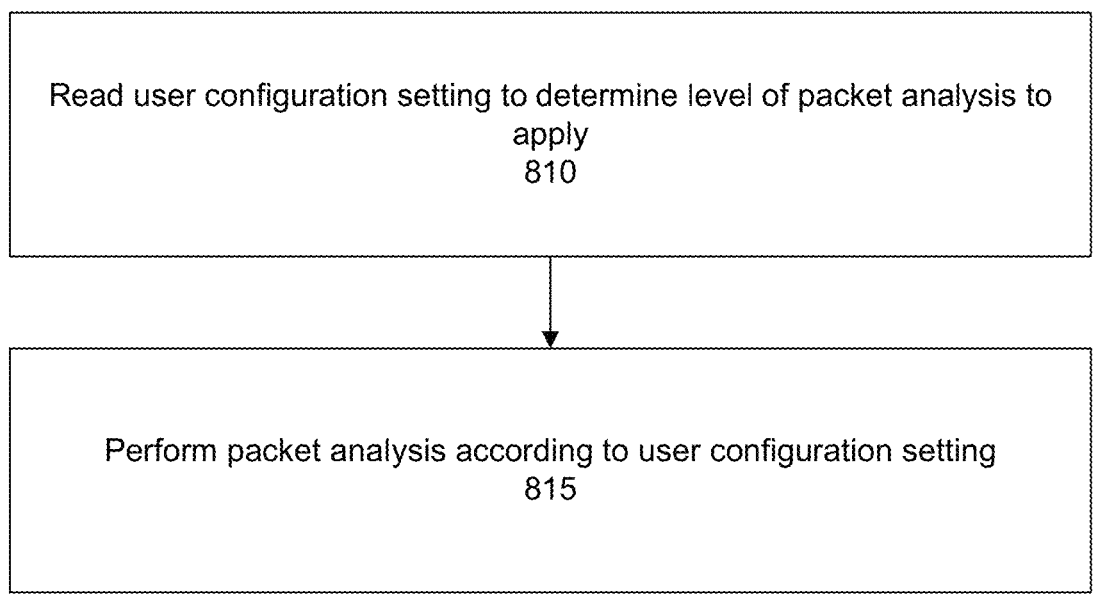
FIG. 8 shows an initial flow for packet analysis, according to one or more embodiments.

FIG. 8 shows an initial flow for packet analysis. In a step 810, a user configuration setting is read to determine a level of packet analysis that should be performed. In a specific embodiment, three levels of analysis are provided. A first level of analysis may be referred to as "allpackets." The "allpackets" analysis level indicates that all packets received should be sent to IDS. An "allpackets" analysis may be recommended to ensure a highly secure environment, but may result in low overall performance of the service processor because of the overhead required to process all the packets. Generally, the service processor may not be as powerful as the host processor. Thus, it is desirable that the service processor not be overloaded. The configuration setting allows administrators to tailor the level of analysis as they see fit.

A second level of analysis may be referred to "performance." The "performance" analysis level includes a first pass evaluation based on the blacklist, whitelist, or both, but does not include IDS evaluation. For example, in various specific embodiments, a packet having an associated source IP address that is listed on the blacklist will be blocked or dropped. A packet having an associated source IP address that is not listed on the blacklist will be allowed to pass. A packet having an associated source IP address that is listed on the whitelist will be allowed to pass. A packet having an associated source IP address that is not listed on the whitelist will be blocked or dropped.

A third level of analysis may be referred to as "fuzzy." The "fuzzy" analysis level includes a decision making block where a first pass evaluation will occur and, based on the first pass evaluation, the packet may or may not be passed to the IDS system. The "fuzzy" analysis level can offer a mix of performance and security.

In a step 815, a packet analysis is performed according to the user configuration setting.

Figure 9:
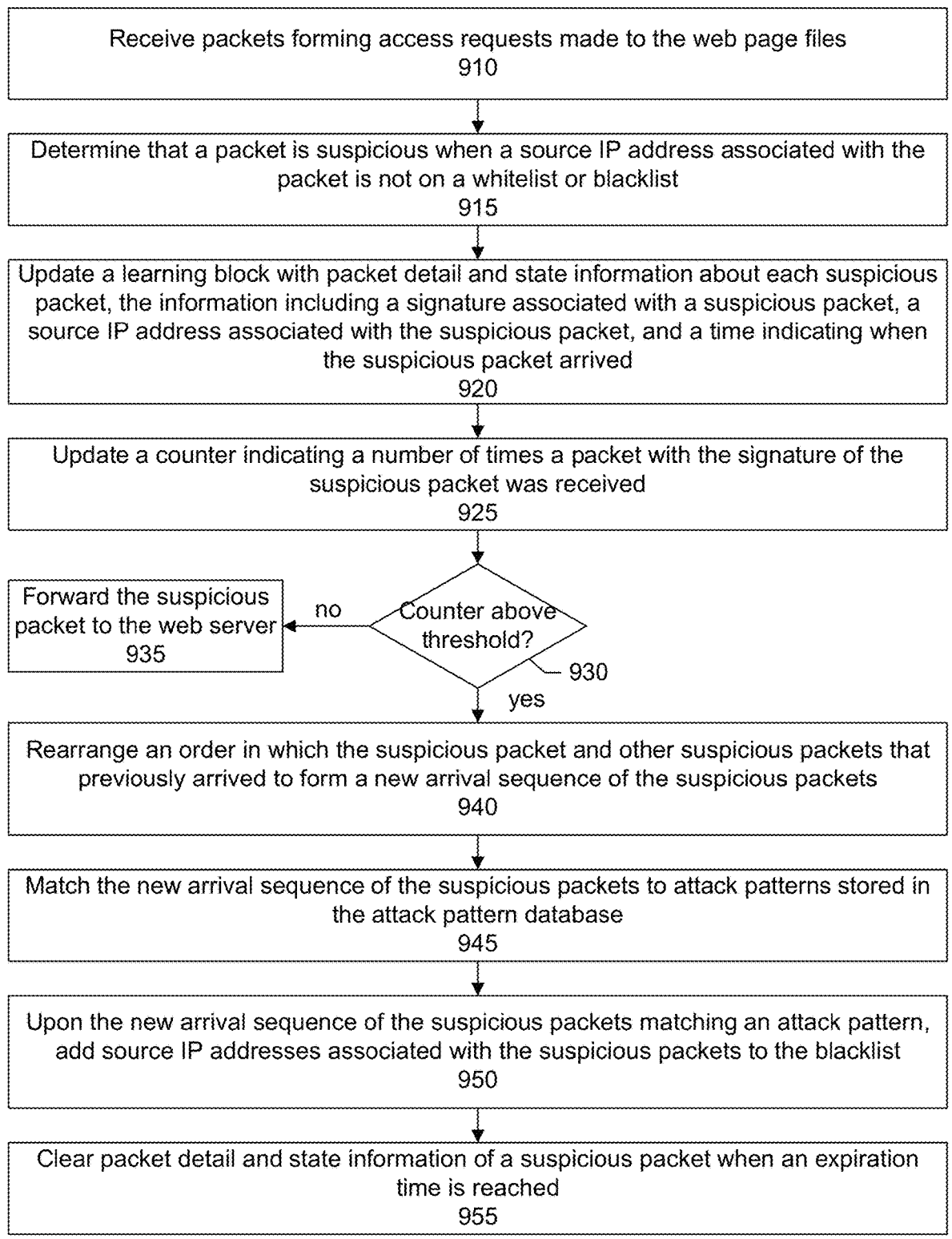
FIG. 9 shows a flow of another monitoring task, according to one or more embodiments.

FIG. 9 shows a flow of another monitoring task that may be referred to as "fuzzy" packet analysis. In a step 910, packets forming accessing requests made to the web files are received. In a step 915, a packet is determined to be suspicious when a source IP address associated with the packet is not on a whitelist or blacklist.

In a step 920, a learning block or internal data structure is updated with packet detail and state information about each suspicious packet. The information may include a signature associated with a suspicious packet, a source IP address associated with the suspicious packet, and a timestamp indicating when the suspicious packet arrived.

In a step 925, a counter is incremented indicating a number of times a packet with the signature of the suspicious packet was received.

In a step 930, a determination is made as to whether the counter is above a threshold. If the counter is below the threshold, the suspicious packet is allowed to pass and is forwarded to the web server (step 935).

Alternatively, if the counter is above the threshold, in a step 940, an order in which the suspicious packet and other suspicious packets that arrived previously is rearranged to form a new arrival sequence of the suspicious packets. The suspicious packets may be reordered into any number of new arrival sequences. As an example, consider that packet A arrived at time T1, packet B arrived at time T2 after time T1, and packet C arrived at time T3 after times T1 and T2. Thus, the arrival sequence is packet A, followed by packet B, followed by packet C. In an embodiment, the packets may be reordered into a first new arrival sequence that includes packet A, followed by packet C, followed by packet B. That is, packet A is arranged to arrive at time T1, packet C is arranged to arrive at time T2, and packet B is arranged to arrive at time T3. The packets may be reordered into a second new arrival sequence that includes packet C, followed by packet B, followed by packet A. That is, packet C is arranged to arrive at time T1, packet B is arranged to arrive at time T2, and packet A is arranged to arrive at time T3. And so forth.

In a step 945, an attempt is made to match the new arrival sequence of the suspicious packets to attack patterns stored in the attack pattern database. In other words, the suspicious packet may be analyzed in conjunction with other packets that arrived previously and that were also determined to be suspicious. The analysis may include, for example, identifying the other packets based on at least partial signature matches to the suspicious packets. The identification may include, for example, identifying source IP addresses of the packets.

In a step 950, upon the new arrival sequence of the suspicious packets matching an attack pattern, source IP addresses associated with the suspicious pacts are added to the blacklist.

In a step 955, the stored packet detail and state information of a suspicious packet is cleared when an expiration time or other triggering event is reached. This provides a garbage collection mechanism so that storage space can be reclaimed. The expiration time can be a user-configurable value. For example, an administrator may configure the expiration time to be 30 minutes, 1 hour, 5 hours, 1 day, 2 days, 1 week, or any other time period as desired. Alternatively, the clearing of a suspicious packet may be triggered based on available storage space. In this specific embodiment, once the limits of storage space for the suspicious packet detail and state information has been reached, information associated with the oldest packets may be cleared to make room for information associated with newer packets that arrived after the older packets.

In a specific embodiment, the server host may be configured to direct all received packets to the service processor for analysis. If the service processor determines that a packet is not malicious, the service processor may forward the packet to the host web server for further processing. If, however, the service processor determines that the packet is malicious, the service processor may drop the packet and may not forward the packet to the host web server for further processing. In another specific embodiment, the server host may be configured to direct a portion of the received packets to the service processor for analysis.

Table D below shows an algorithm for packet analysis according to one or more embodiments.

TABLE D

| Step | Description |
|---|---|
| 0 | For packet(i) from first pass queue: |
| 1 | Initialize Cache data structure |
| 2 | Read User configuration: Set analysis flags (1 = allpackets, 2 = performance, 3 = fuzzy)<br>   1. Allpackets: Indicate, all packets will be sent to IDS. Recommended for super secure environment but very low performance of SP<br>   2. Performance No IDS evaluation. Only first pass evaluation based on black and white lists<br>   3. Fuzzy: This is a decision making block where the first pass evaluation will happen. This offers a mix of performance and security |
| 3 | Read whitelist/blacklist information |
| 4 | Decode TCP and IP header information |
| 5 | If information matches whitelist: pass the packet |
| 6 | If information matches blacklist: pass the packet to the IDS block |
| 7 | Else:<br>   1. Check for stored information from the internal cache and look for prospective match<br>   2. If TCP/IP header signature matches and is greater than expected packet incoming threshold forward to the learning block<br>   3. For each packet reaching the learning block<br>      i. The packet details are stored along with a state information where it notes the anomalies in the incoming packets<br>      ii. The same attack signature may come from different IP addresses, so storing the source IP is not enough. Understanding the signature and storing the state for the suspected packet.<br>      iii. The next packet may come after an interval bearing a similar signature but from a different IP<br>      iv. For each such packet increase the alert indicator number by the number of times the signature appears $A(N) \mathrel{+}= Ai * N$ where N is number of packets and Ai is the initial alert indicator<br>      v. A suspected packet will be moved to the IDS queue. It will be allowed to pass through until the threshold is breached.<br>   4. The learning block will keep on updating the cache information based on the signature assessment |
| 8 | The algorithm may look at firewall rules to see if only intended protocol packets directed at proper ports are received. Port scanning attacks will match signatures of attacks and the learning block will take actions |
| 9 | If the Alert Indicator crosses a predefined threshold the packets will be held back and passed on to the Intrusion detection block for complete analysis |
| 10 | The learning block may be extended to update the blacklist/signaturedb on the event of matched signature so that the set of IP addresses are filtered at the beginning itself |

A packet analysis may include examining packet syntax, semantics, letter case (e.g., upper case versus lower case), studying packet payload, cross referencing to a corresponding access request, accessing context information associated with the packet (e.g., source IP address, packet arrival sequence, reviewing other packets having the same or similar signature, reviewing other access requests from the same IP address), reviewing TCP/IP header data, media access control address (MAC) address, protocol (e.g., HTTP versus FTP), port, and so forth. A packet signature or other pattern deemed malicious may be added to the signature database.

Table E shows an attack pattern probabilistic model that may be employed by the security monitoring module of the service processor according to one or more embodiments.

TABLE E

| Step | Description |
|---|---|
| 1 | For (packet[1:n])<br>    if(packet matches Whitelist)<br>        Forwardpacket( )<br>    Else if( packet matches Blacklist)<br>        Droppacket( )<br>    Else<br>        SuspectPacket( ); |
| 2 | SuspectPacket( ):<br>    packetExistinFirstPass = CheckinFirstPass(Packet)<br>    if(PacketExistinFirstPass)<br>        UpdateLearningBlock(Packet)<br>    Else<br>        Call Scanner( )  //SELECTION HAPPENS HERE First packet always goes to Scanner<br>    Breach = CheckThreshold(Packet)<br>    If(Breach >= T) //T = threshold set<br>        UpdateBlackList(AddressList, Options)<br>CheckinFirstPass( ) :<br>IPFound= CheckSourceAddress( ) //may indicate spoofed IP<br>    If(IPFound == False)<br>        MatchHeaderSignature( )<br>        {<br>            matchThreshold = FastHashSearch(Header, Dictionary)<br>            if(matchThreshold < N/2) //matches less than the half of the header parameters where N = number of match points<br>                return FALSE<br>        Else<br>            AddToPacketStructure(Packet, UpdatePossibleAddress( ) ) //Create the IP range to block<br>            return TRUE |
| 3 | Call Scanner( ):<br>protocolfound = DetermineProtocol(packet, protocol);<br>If(protocolfound)<br>    Proto_dictionary = LoadDictionary(protocol);<br>for (items in Proto_dictionary)<br>    SignatureMatch = Match_Signature( );<br>    If(SignatureMatch)<br>        UpdateLearningBlock(Packet, Signature)<br>        break<br>    else<br>        continue<br>    else<br>        UpdateLearningBlock(Packet, PROTO_ANY) //protocol not recognized treat as SUSPECT packet |
| 4 | //Learn Packet Characteristics and update state parameters<br>    UpdateLearningBlock(Packet, Options):<br>        InitializeStructures(Options) //Create state structures based on known protocols or proto_any<br>    Packet_Header_Dictionary = ParsePacket( )<br>    Structure_ID = UpdateStucture(Packet_Header_Dictionary)<br>    BindToTimer(Structure_ID, Time_T) //is it really a sweep attack<br>UpdateStructure:<br>    ParsePacketHeader( )<br>    Match = Match_in_PacketDictionary( )<br>    If(Match)<br>        ManagePacketOrder( ) //Learn packet ordering<br>        CheckIPParameters( ) //Check for IP header parameters, like<br>        LearnChangedParameters( ) //Update States per packet identifier<br>        K = Match-with-IP-AttackRules( ) //K = number of IP rule violations<br>        Packet_Header_Dictionary[Structure_ID].Threshold++ //increment threshold |
| 5 | CheckTimerValue( ):<br>    if(Timer(packet)> TIME_OUT)<br>        if(CheckThresholdPacket( ) < T) //too few packets of bother or not a threat<br>            ClearPacketState(Packet) |

Figure 10:
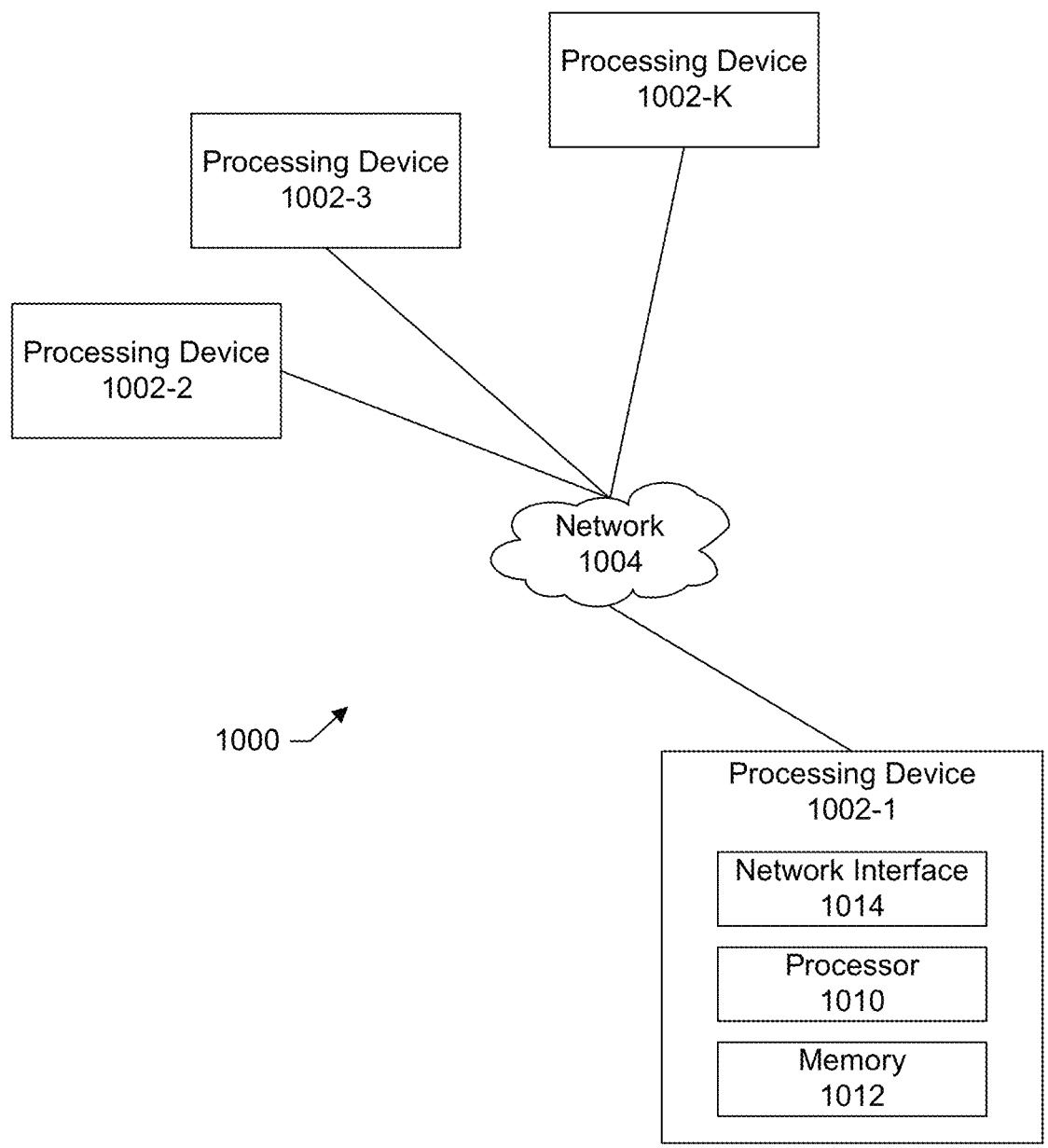
FIG. 10 shows a block diagram of a processing platform that may be utilized to implement at least a portion of an information processing system, according to one or more embodiments.

FIG. 10 shows a block diagram of a processing platform that may be used in a security monitoring system.

The processing platform 1000 in this embodiment includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and a system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform are illustratively implemented in the form of software running on one or more processing devices.

Figure 11:
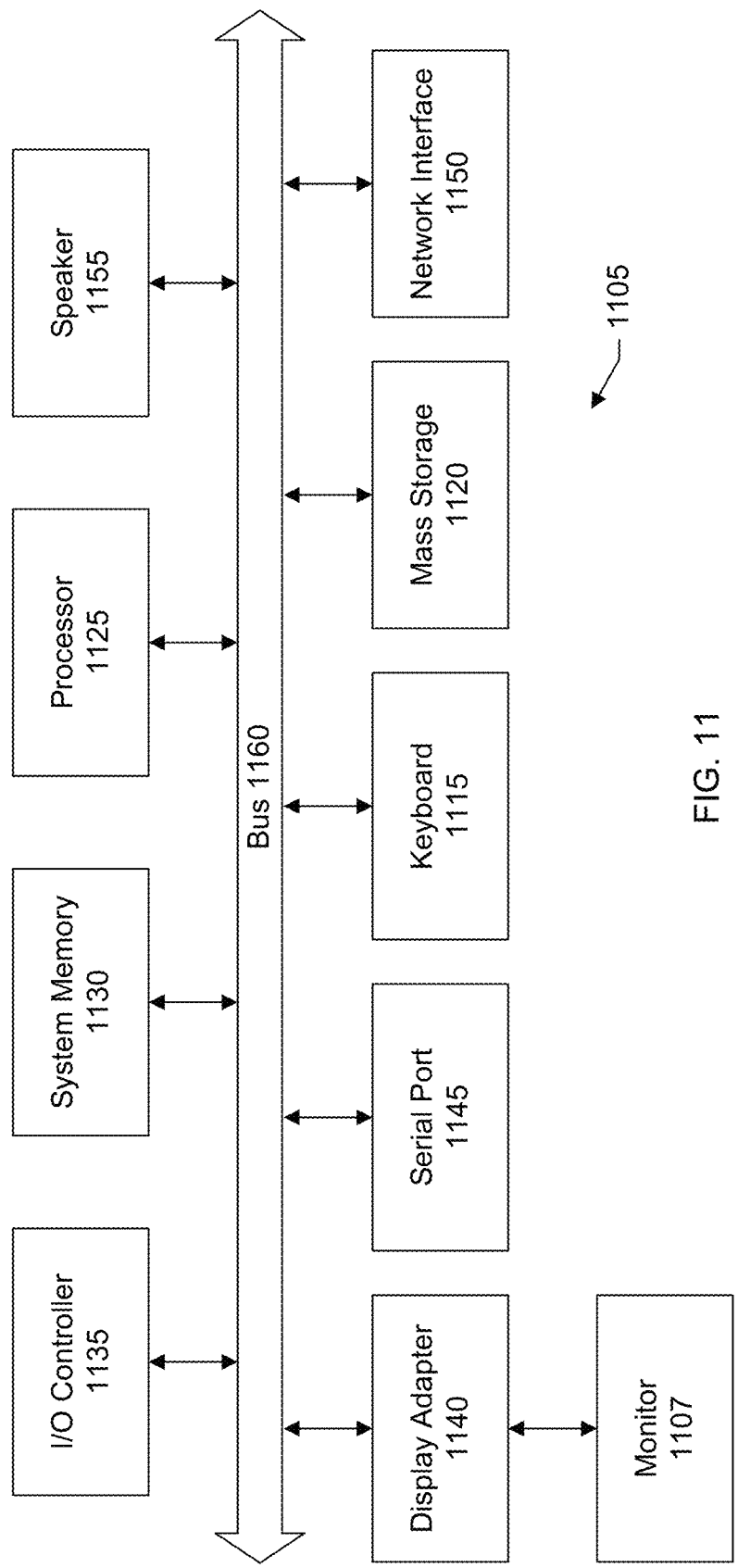
FIG. 11 shows a block diagram of a computer system suitable for use with the system, according to one or more embodiments.

FIG. 11 shows a system block diagram of a computer system 1105 used to execute the software of the present system described herein. The computer system includes a monitor 1107, keyboard 1115, and mass storage devices 1120. Computer system 1105 further includes subsystems such as central processor 1125, system memory 1130, input/output (I/O) controller 1135, display adapter 1140, serial or universal serial bus (USB) port 1145, network interface 1150, and speaker 1155. The system may also be used with computer systems with additional or fewer subsystems. For example, a computer system could include more than one processor 1125 (i.e., a multiprocessor system) or a system may include a cache memory.

Arrows such as 1160 represent the system bus architecture of computer system 1105. However, these arrows are illustrative of any interconnection scheme serving to link the subsystems. For example, speaker 1155 could be connected to the other subsystems through a port or have an internal direct connection to central processor 1125. The processor may include multiple processors or a multicore processor, which may permit parallel processing of information. Computer system 1105 shown in FIG. 11 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers. The variable N and other similar index variables are assumed to be arbitrary positive integers greater than or equal to two.

In a specific embodiment, there is a method for protecting against attacks to web page files hosted on a web server comprising: performing a plurality of monitoring tasks by a service processor, the service processor being hosted by a baseboard management controller (BMC) and independent of a central processing unit (CPU) of the web server, the plurality of monitoring tasks comprising: periodically checking the web page files for changes indicating the web page files have been compromised; receiving a plurality of packets forming access requests made to the web page files; determining that a packet is suspicious when an Internet Protocol (IP) address source associated with the packet is not on a whitelist or a blacklist; updating a learning block with information about each suspicious packet, the information comprising a signature associated with a suspicious packet, an Internet Protocol (IP) address source associated with the suspicious packet, and a time indicating when the suspicious packet arrived; updating a counter indicating a number of times a packet with the signature of the suspicious packet was received; forwarding the suspicious packet to the web server when the counter is below a threshold; not forwarding the suspicious packet to the web server when the counter is above the threshold; and upon not forwarding the suspicious packet, analyzing the suspicious packet in conjunction with other packets previously determined to be suspicious, the analyzing comprising: rearranging an order in which the suspicious packet and the other suspicious packets arrived to form a new arrival sequence of the suspicious packets; matching the new arrival sequence of the suspicious packets to attack patterns stored in an attack pattern database; and upon the new arrival sequence of the suspicious packets matching an attack pattern, adding source IP addresses associated with the suspicious packets matching the attack pattern to the blacklist.

In another specific embodiment, there is a system comprising: a processor; and memory configured to store one or more sequences of instructions which, when executed by the processor, cause the processor to carry out the steps of protecting against attacks to web files hosted on a web server by: performing a plurality of monitoring tasks by a service processor, the service processor being hosted by a baseboard management controller (BMC) and independent of a central processing unit (CPU) of the web server, the plurality of monitoring tasks comprising: receiving a plurality of packets forming access requests made to the web files; determining that a packet is suspicious when a source Internet Protocol (IP) address associated with the packet is not on a whitelist or a blacklist; updating a learning block with information about each suspicious packet, the information comprising a signature associated with the suspicious packet, a source IP address associated with the suspicious packet, and a time indicating when the suspicious packet arrived; updating a counter indicating a number of times a packet with the signature of the suspicious packet was received; forwarding the suspicious packet to the web server when the counter is below a threshold; not forwarding the suspicious packet to the web server when the counter is above the threshold; and upon not forwarding the suspicious packet, analyzing the suspicious packet in conjunction with other packets previously determined to be suspicious, the analyzing comprising: rearranging an order in which the suspicious packet and the other suspicious packets arrived to form a new arrival sequence of the suspicious packets; matching the new arrival sequence of the suspicious packets to attack patterns stored in an attack pattern database; and upon the new arrival sequence of the suspicious packets matching an attack pattern, adding source IP addresses associated with the suspicious packets matching the attack pattern to the blacklist.

The plurality of monitoring tasks may include periodically checking the web files for changes indicating the web files have been compromised.

The plurality of monitoring tasks may include requesting, by the service processor at a first time, that the web files be copied to a shared storage accessible by the service processor and host CPU to create a first copy; requesting, by the service processor at a second time, after the first time, that the web files be copied to the shared storage to create a second copy; comparing the second copy against the first copy to detect any changes indicated the web files were compromised; and generating an alert notification upon detecting the changes.

The plurality of monitoring tasks may include requesting, by the service processor, that logs associated with the web files be copied to a shared storage accessible by the service processor and host CPU, the logs comprising entries storing access requests made to the web files; comparing the access requests against a database of attack patterns; and generating an alert notification upon detecting that an access request matches an attack pattern.

In an embodiment, the service processor is powered independent of the host CPU. In an embodiment, the service processor and host CPU reside in a same single box.

In another specific embodiment, there is a method for protecting against attacks to web files hosted on a web server comprising: performing a plurality of monitoring tasks by a service processor, the service processor being hosted by a baseboard management controller (BMC) and independent of a central processing unit (CPU) of the web server, the plurality of monitoring tasks comprising: receiving a plurality of packets forming access requests made to the web files; determining that a packet is suspicious when a source Internet Protocol (IP) address associated with the packet is not on a whitelist or a blacklist; updating a learning block with information about each suspicious packet, the information comprising a signature associated with the suspicious packet, a source IP address associated with the suspicious packet, and a time indicating when the suspicious packet arrived; updating a counter indicating a number of times a packet with the signature of the suspicious packet was received; forwarding the suspicious packet to the web server when the counter is below a threshold; not forwarding the suspicious packet to the web server when the counter is above the threshold; and upon not forwarding the suspicious packet, analyzing the suspicious packet in conjunction with other packets previously determined to be suspicious, the analyzing comprising: rearranging an order in which the suspicious packet and the other suspicious packets arrived to form a new arrival sequence of the suspicious packets; matching the new arrival sequence of the suspicious packets to attack patterns stored in an attack pattern database; and upon the new arrival sequence of the suspicious packets matching an attack pattern, adding source IP addresses associated with the suspicious packets matching the attack pattern to the blacklist.

In another specific embodiment, there is a computer program product, comprising a non-transitory computer-readable medium having a computer-readable program code embodied therein, the computer-readable program code adapted to be executed by one or more processors to implement a method comprising: performing a plurality of monitoring tasks by a service processor, the service processor being hosted by a baseboard management controller (BMC) and independent of a central processing unit (CPU) of the web server, the plurality of monitoring tasks comprising: receiving a plurality of packets forming access requests made to the web files; determining that a packet is suspicious when a source Internet Protocol (IP) address associated with the packet is not on a whitelist or a blacklist; updating a learning block with information about each suspicious packet, the information comprising a signature associated with the suspicious packet, a source IP address associated with the suspicious packet, and a time indicating when the suspicious packet arrived; updating a counter indicating a number of times a packet with the signature of the suspicious packet was received; forwarding the suspicious packet to the web server when the counter is below a threshold; not forwarding the suspicious packet to the web server when the counter is above the threshold; and upon not forwarding the suspicious packet, analyzing the suspicious packet in conjunction with other packets previously determined to be suspicious, the analyzing comprising: rearranging an order in which the suspicious packet and the other suspicious packets arrived to form a new arrival sequence of the suspicious packets; matching the new arrival sequence of the suspicious packets to attack patterns stored in an attack pattern database; and upon the new arrival sequence of the suspicious packets matching an attack pattern, adding source IP addresses associated with the suspicious packets matching the attack pattern to the blacklist.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A system comprising: a processor; and memory configured to store one or more sequences of instructions which, when executed by the processor, cause the processor to carry out the steps of protecting against attacks to web files hosted on a web server by:

performing a plurality of monitoring tasks by a service processor, the service processor being hosted by a baseboard management controller (BMC) and independent of a central processing unit (CPU) of the web server, the plurality of monitoring tasks comprising:

receiving a plurality of packets forming access requests made to the web files;

determining that a packet is suspicious when a source Internet Protocol (IP) address associated with the packet is not on a whitelist or a blacklist;

updating a learning block with information about each suspicious packet, the information comprising a signature associated with the suspicious packet, a source IP address associated with the suspicious packet, and a time indicating when the suspicious packet arrived;

updating a counter indicating a number of times a packet with the signature of the suspicious packet was received;

forwarding the suspicious packet to the web server when the counter is below a threshold;

not forwarding the suspicious packet to the web server when the counter is above the threshold; and upon not forwarding the suspicious packet, analyzing the suspicious packet in conjunction with other packets previously determined to be suspicious, the analyzing comprising:

rearranging an order in which the suspicious packet and the other suspicious packets arrived to form a new arrival sequence of the suspicious packets;

matching the new arrival sequence of the suspicious packets to attack patterns stored in an attack pattern database; and upon the new arrival sequence of the suspicious packets matching an attack pattern, adding source IP addresses associated with the suspicious packets matching the attack pattern to the blacklist.

2. The system of claim 1 wherein the plurality of monitoring tasks comprise periodically checking the web files for changes indicating the web files have been compromised.

3. The system of claim 1 wherein the plurality of monitoring tasks comprise:

requesting, by the service processor at a first time, that the web files be copied to a shared storage accessible by the service processor and host CPU to create a first copy;

requesting, by the service processor at a second time, after the first time, that the web files be copied to the shared storage to create a second copy;

comparing the second copy against the first copy to detect any changes indicated the web files were compromised; and generating an alert notification upon detecting the changes.

4. The system of claim 1 wherein the plurality of monitoring tasks comprise:

requesting, by the service processor, that logs associated with the web files be copied to a shared storage accessible by the service processor and host CPU, the logs comprising entries storing access requests made to the web files;

comparing the access requests against a database of attack patterns; and generating an alert notification upon detecting that an access request matches an attack pattern.

5. The system of claim 1 wherein the service processor is powered independent of the host CPU.

6. The system of claim 1 wherein the service processor and host CPU reside in a same single box.

7. A method for protecting against attacks to web files hosted on a web server comprising:

performing a plurality of monitoring tasks by a service processor, the service processor being hosted by a baseboard management controller (BMC) and independent of a central processing unit (CPU) of the web server, the plurality of monitoring tasks comprising:

receiving a plurality of packets forming access requests made to the web files;

determining that a packet is suspicious when a source Internet Protocol (IP) address associated with the packet is not on a whitelist or a blacklist;

updating a learning block with information about each suspicious packet, the information comprising a signature associated with the suspicious packet, a source IP address associated with the suspicious packet, and a time indicating when the suspicious packet arrived;

updating a counter indicating a number of times a packet with the signature of the suspicious packet was received;

forwarding the suspicious packet to the web server when the counter is below a threshold;

not forwarding the suspicious packet to the web server when the counter is above the threshold; and upon not forwarding the suspicious packet, analyzing the suspicious packet in conjunction with other packets previously determined to be suspicious, the analyzing comprising:

rearranging an order in which the suspicious packet and the other suspicious packets arrived to form a new arrival sequence of the suspicious packets;

matching the new arrival sequence of the suspicious packets to attack patterns stored in an attack pattern database; and upon the new arrival sequence of the suspicious packets matching an attack pattern, adding source IP addresses associated with the suspicious packets matching the attack pattern to the blacklist.

8. The method of claim 7 wherein the plurality of monitoring tasks comprise periodically checking the web files for changes indicating the web files have been compromised.

9. The method of claim 7 wherein the plurality of monitoring tasks comprise:

requesting, by the service processor at a first time, that the web files be copied to a shared storage accessible by the service processor and host CPU to create a first copy;

requesting, by the service processor at a second time, after the first time, that the web files be copied to the shared storage to create a second copy;

comparing the second copy against the first copy to detect any changes indicated the web files were compromised; and generating an alert notification upon detecting the changes.

10. The method of claim 7 wherein the plurality of monitoring tasks comprise:

requesting, by the service processor, that logs associated with the web files be copied to a shared storage accessible by the service processor and host CPU, the logs comprising entries storing access requests made to the web files;

comparing the access requests against a database of attack patterns; and generating an alert notification upon detecting that an access request matches an attack pattern.

11. The method of claim 7 wherein the service processor is powered independent of the host CPU.

12. The method of claim 7 wherein the service processor and host CPU reside in a same single box.

13. A computer program product, comprising a non-transitory computer-readable medium having a computer-readable program code embodied therein, the computer-readable program code adapted to be executed by one or more processors to implement a method comprising:

performing a plurality of monitoring tasks by a service processor, the service processor being hosted by a baseboard management controller (BMC) and independent of a central processing unit (CPU) of the web server, the plurality of monitoring tasks comprising:

receiving a plurality of packets forming access requests made to the web files;

determining that a packet is suspicious when a source Internet Protocol (IP) address associated with the packet is not on a whitelist or a blacklist;

updating a learning block with information about each suspicious packet, the information comprising a signature associated with the suspicious packet, a source IP address associated with the suspicious packet, and a time indicating when the suspicious packet arrived;

updating a counter indicating a number of times a packet with the signature of the suspicious packet was received;

forwarding the suspicious packet to the web server when the counter is below a threshold;

not forwarding the suspicious packet to the web server when the counter is above the threshold; and upon not forwarding the suspicious packet, analyzing the suspicious packet in conjunction with other packets previously determined to be suspicious, the analyzing comprising:

rearranging an order in which the suspicious packet and the other suspicious packets arrived to form a new arrival sequence of the suspicious packets;

matching the new arrival sequence of the suspicious packets to attack patterns stored in an attack pattern database; and upon the new arrival sequence of the suspicious packets matching an attack pattern, adding source IP addresses associated with the suspicious packets matching the attack pattern to the blacklist.

14. The computer program product of claim 13 wherein the plurality of monitoring tasks comprise periodically checking the web files for changes indicating the web files have been compromised.

15. The computer program product of claim 13 wherein the plurality of monitoring tasks comprise:

requesting, by the service processor at a first time, that the web files be copied to a shared storage accessible by the service processor and host CPU to create a first copy;

requesting, by the service processor at a second time, after the first time, that the web files be copied to the shared storage to create a second copy;

comparing the second copy against the first copy to detect any changes indicated the web files were compromised; and generating an alert notification upon detecting the changes.

16. The computer program product of claim 13 wherein the plurality of monitoring tasks comprise:

requesting, by the service processor, that logs associated with the web files be copied to a shared storage accessible by the service processor and host CPU, the logs comprising entries storing access requests made to the web files;

comparing the access requests against a database of attack patterns; and generating an alert notification upon detecting that an access request matches an attack pattern.

17. The computer program product of claim 13 wherein the service processor is powered independent of the host CPU.

18. The computer program product of claim 13 wherein the service processor and host CPU reside in a same single box.

* * * * *